Figure 1:
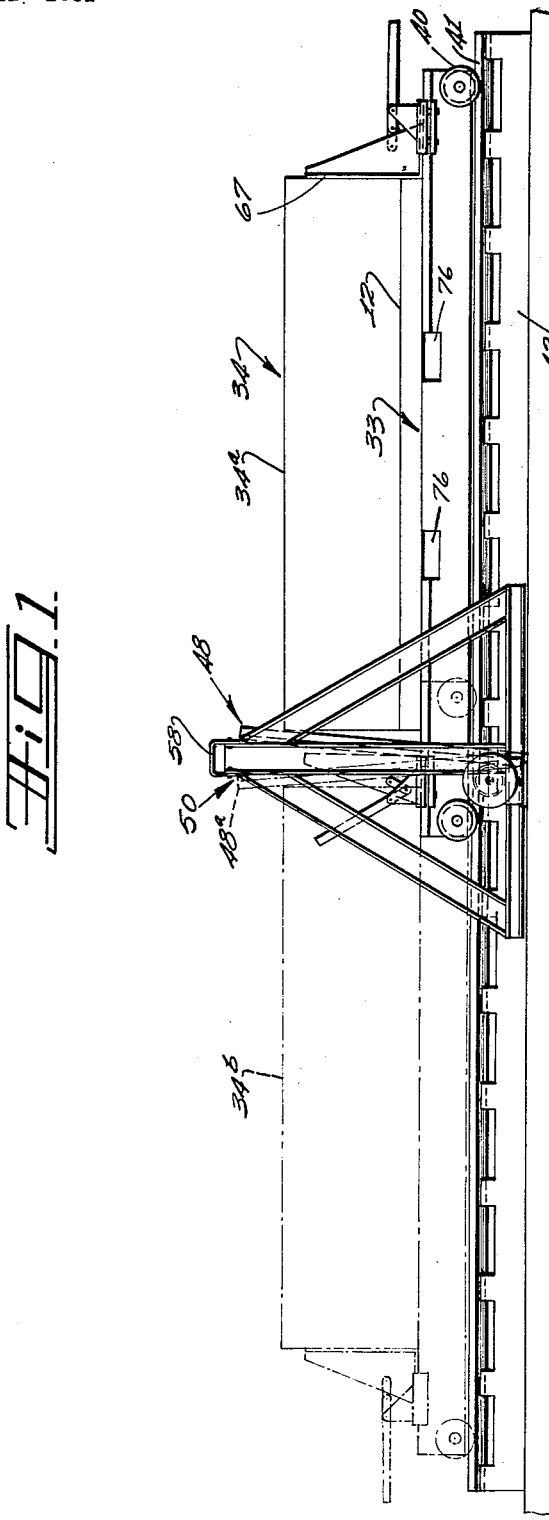

May 7, 1963 J. L. MENNITT 3,088,186
APPARATUS FOR SUPPORTING AND CUTTING SEMIPLASTIC BODIES
Filed Jan. 11, 1961 6 Sheets-Sheet 2

INVENTOR
JOSEPH L. MENNITT
BY
Rule and Hoge.
ATTORNEYS

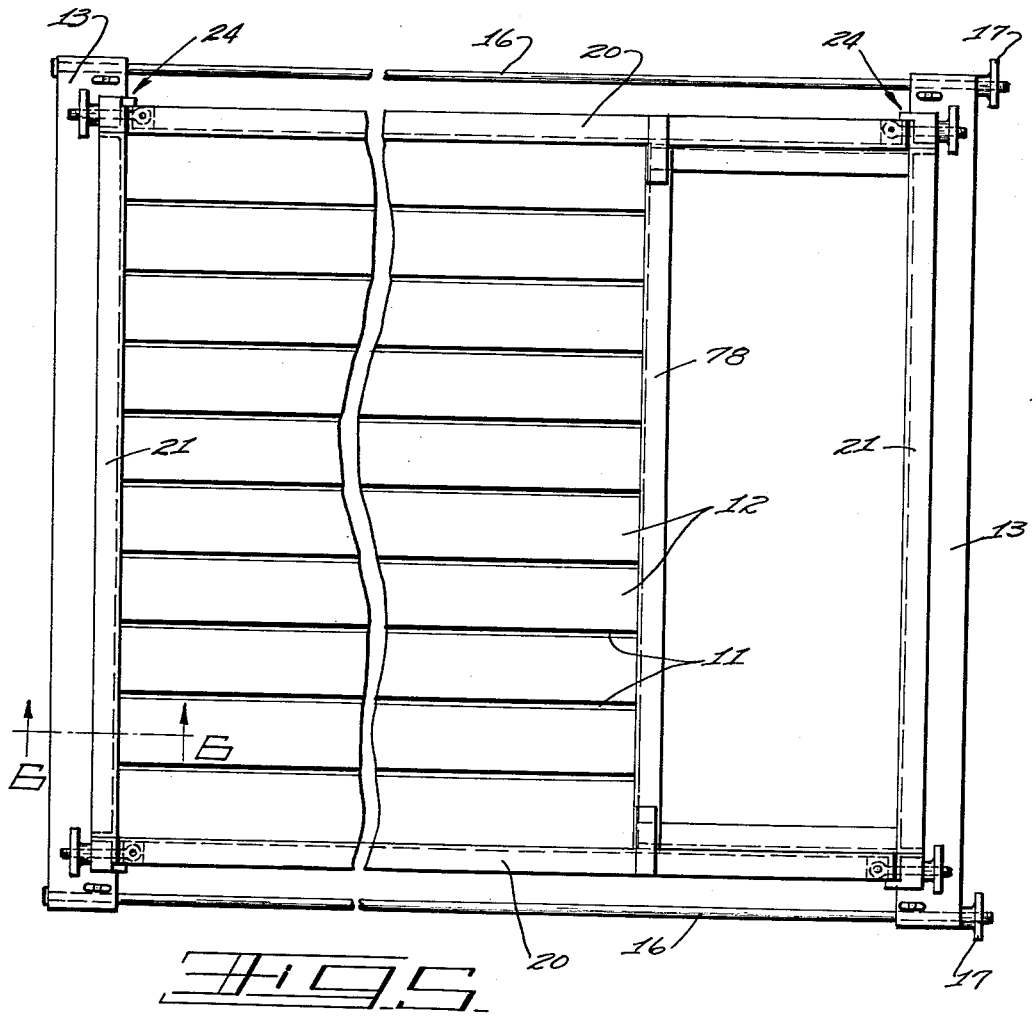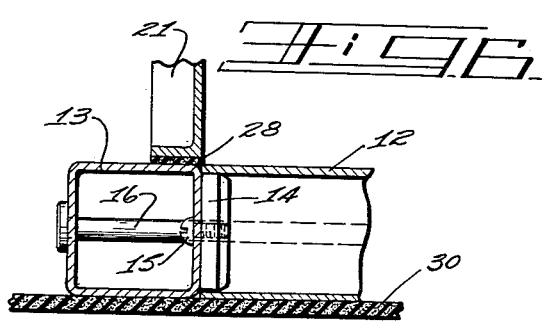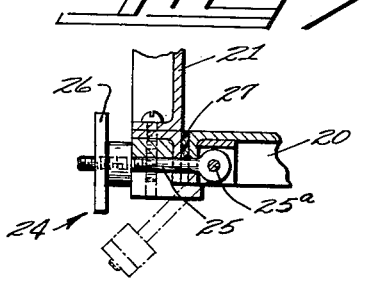

May 7, 1963  J. L. MENNITT  3,088,186
APPARATUS FOR SUPPORTING AND CUTTING SEMIPLASTIC BODIES
Filed Jan. 11, 1961  6 Sheets-Sheet 6
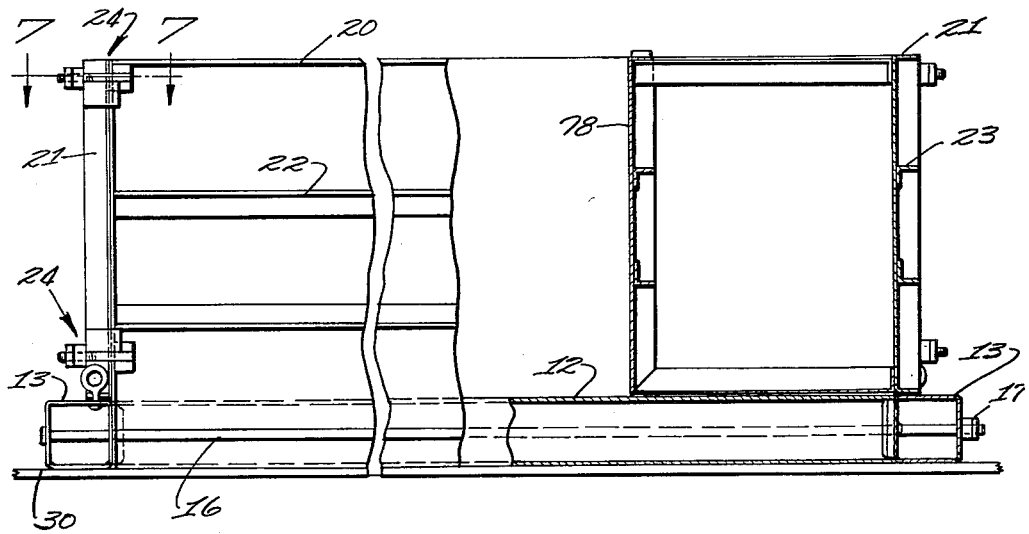
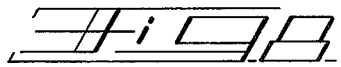
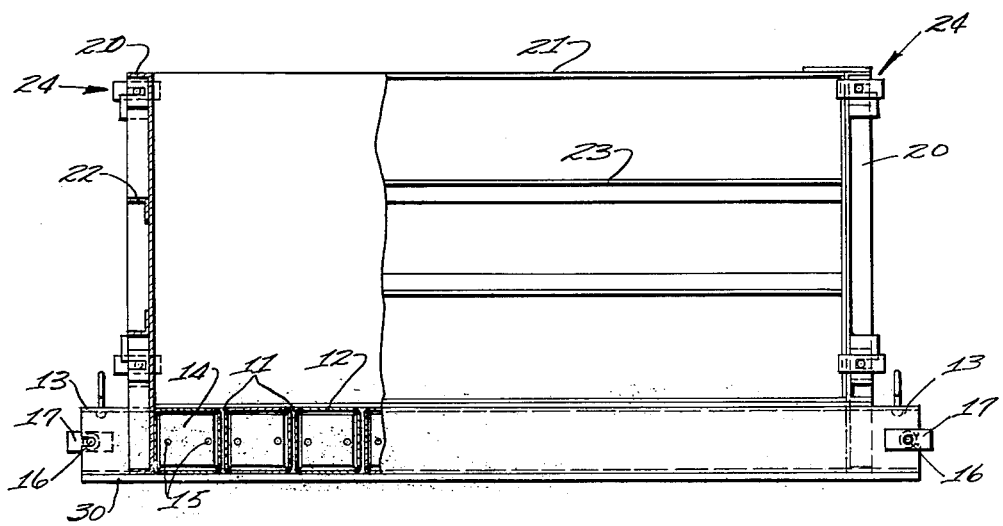
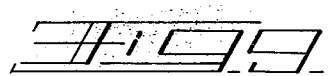
INVENTOR
JOSEPH L. MENNITT
BY
ATTORNEYS United States Patent Office 3,088,186
Patented May 7, 1963

3,088,186
APPARATUS FOR SUPPORTING AND CUTTING
SEMIPLASTIC BODIES
Joseph L. Mennitt, Toledo, Ohio, assignor to Owens-
Illinois Glass Company, a corporation of Ohio
Filed Jan. 11, 1961, Ser. No. 84,476
4 Claims. (Cl. 25—112)

The present application is a continuation-in-part of my copending application, Serial No. 619,319, filed October 30, 1956, and entitled "Method and Apparatus for Molding and Wire Cutting Structural Materials."

My invention relates to a method and apparatus for forming various structural units such as partition slabs and other building blocks from cellular silicate or similar materials. It has been found advantageous to cast these materials in molds and thereafter to cut the molded body, when solidified into a semiplastic state, into a plurality of slabs of the desired size. Material used to form the molded body is typically a foamed cementitious slurry which is prehardened into a semiplastic state so as to be self-supporting and still be capable of being wire cut. After the molded body is severed, the resultant slabs are placed in an autoclave in spaced-apart relationship and are steam hardened or cured to achieve ultimate strength. The material when it is in the aforementioned prehardened state is extremely fragile and weak in tension. Accordingly, great care must be taken to avoid stressing the material during the handling of the molded body and slabs prior to the time that the slabs are steam hardened. In apparatus heretofore used for this purpose the molds are heavy, cumbersome, and costly. The cutting machines are also costly due to the intricate mechanical arrangements necessary for supporting the molded body during the cutting in order to avoid breaking or cracking of the molded body or individual slabs. Conventional molds and cutting apparatus are also objectionable in that they fail to provide means for removing the resultant slabs from the cutting apparatus and placing them in the autoclave in spaced-apart relationship.

An object of the present invention is to provide improved means for casting, wire slicing, and handling prehardened cellular silicates or similar materials with comparative ease and without breaking or cracking the material.

Another object of the present invention is to provide apparatus for wire slicing a structurally weak molded body into a plurality of slabs, with each slab being individually supported throughout its length, and capable of being removed, while still supported, from the apparatus independently of the remaining slabs.

The specific nature of this invention, as well as other objects and advantages thereof, will become apparent to those skilled in the art from the following detailed description taken in conjunction with the annexed sheets of drawings on which, by way of example only, the preferred embodiment of this invention is illustrated.

A preferred form of apparatus for practicing my invention is herein illustrated. It provides a mold with a mold bottom comprising longitudinal elements in the form of rectangular tubes arranged in parallel relation and narrowly spaced apart. Molding material in the form of a slurry is poured into the mold. The mold bottom is supported on a pouring bed with surface of sponge rubber or the like to prevent escape of the slurry through the slots. When the material is sufficiently hardened to retain its shape the sides and ends of the mold are removed. The mold bottom with the body of molded material thereon is then transferred to a cutting machine. The cutting machine includes a slotted supporting bed which is mounted for horizontal travel. The molded body during this travel is cut into individual slabs or units by stationary wires which extend through the slots in the supporting bed. During the travel of the supporting bed and the cutting of the material into individual slabs, back-up fingers or plates faced with sponge rubber or the like are held against the trailing end of the body to prevent cracking of the material as the wires leave the body.

Figure 2:
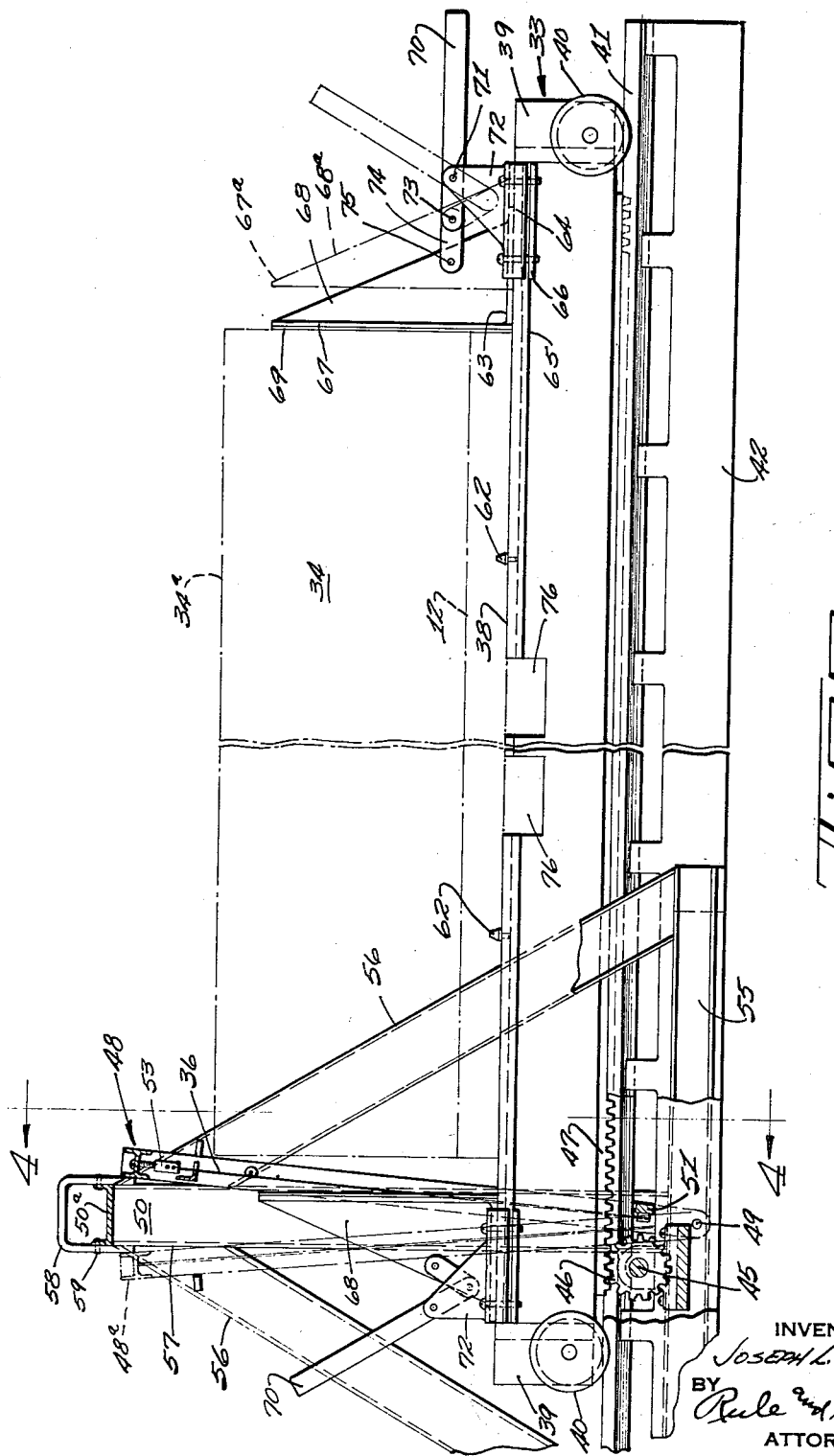
Figure 3:
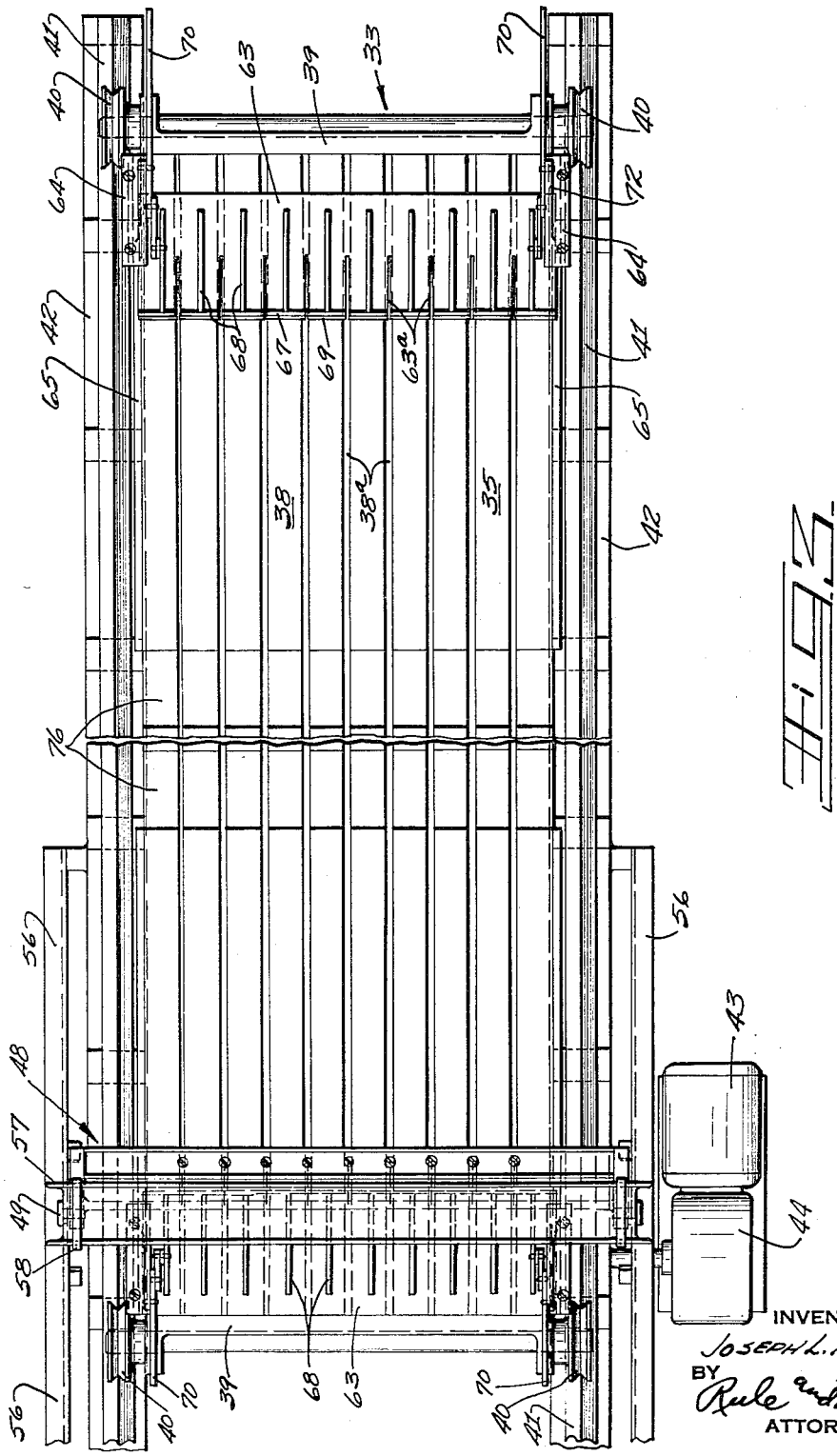
Figure 4:
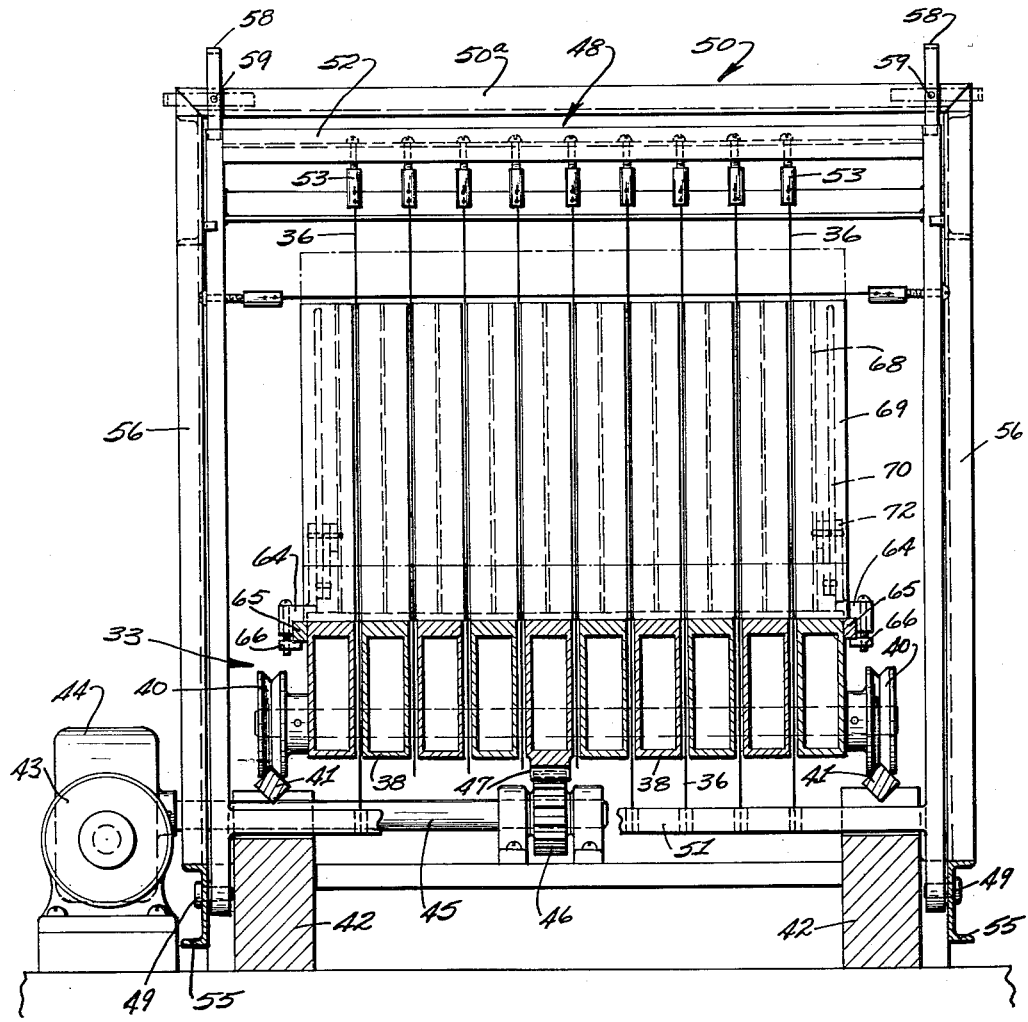

Referring to the drawings:
FIG. 1 is an elevational view of the apparatus, showing a molded body of material mounted on the cutting machine;
FIG. 2 is a similar view on a comparatively large scale, with parts broken away and parts shown in section;
FIG. 3 is a plan view of the apparatus shown in FIG. 2;
FIG. 4 is a section at the line 4—4 on FIG. 2;
FIG. 5 is a plan view of the mold, a part thereof being broken away;
FIG. 6 is a detailed section at the line 6—6 on FIG. 5, showing one of the spacing bars by which the sections of the mold floor are clamped in spaced relation;
FIG. 7 is a section at the line 7—7 on FIG. 8;
FIG. 8 is a longitudinal, part sectional, elevational view of the mold with parts broken away; and,
FIG. 9 is an end elevation of the mold, parts being shown in section.

Referring particularly to FIGS. 5 to 9, the mold includes a mold bottom comprising a plurality of structural members 12 preferably in the form of rectangular tubular units (FIG. 9). These units are narrowly spaced apart to provide slots 11 for the wires by which the body of molded material is severed into a plurality of slabs or units as hereinafter described. The tubes 12 are clamped in spaced relation and held together as a unit by spacing bars 13 extending along both ends of the mold bottom. The bars 13 are rectangular in cross-section (FIG. 6). Plugs 14 are attached to the spacing bars 13 by screw 15 and project into the ends of the tubes 12. Tie rods 16 which extend along the sides of the floor are connected to the spacing bars 13 and serve to draw them into holding engagement with the tubes 12. Knobs 17 are threaded onto the tie rods 16 for drawing the spacing bars 13 into clamping position.

The sides 20 and ends 21 of the mold are preferably made of lightweight sheet metal and are reinforced with angle bars 22 and 23 fastened to their outer surfaces. The sides and ends of the mold are releasably secured together by quick acting clamps 24. Each of these clamps are shown in FIG. 7 comprises a rod 25 which swings about a pivot 25a. A knob 26 is threaded on the rod for clamping the parts together. Vertical strips 27 of sponge rubber or other sealing material are provided at each corner of the mold. Horizontal strips 28 (FIG. 6) of such sealing material are also placed between the spacing bars 13 and the end walls 21 of the mold.

When the mold parts are assembled the mold is placed on a pouring bed with a sponge rubber top 30. The slurry of molding material is then poured into the mold. The rubber top 30 prevents the slurry from escaping through the slots 11. The mold is permitted to stay on the pouring table until the body of molding material has prehardened into a semiplastic state. The mold sides and ends are then removed. The spacing bars 13 now serve as lifting bars by which the mold bottom with the molded body thereon is transferred to the bed of the cutting machine.

Referring to FIGS. 1 to 4, the cutting machine comprises a carriage 33 on which the mold bottom with the body 34 of molded material is placed and carried horizontally lengthwise from the position 34a (FIG. 1) to position 34b. During this travel the body is cut into individual molded slabs or units 35 by means of stationary cutting wires 36, with each of the slabs being individually supported by one of the tubular elements 12. The carriage 33 comprises a supporting bed made up of a plurality of sections or units 38. These as shown are in the form of rectangular tubes of a width and number corresponding to the rectangular tubes 12 forming the mold bottom and are spaced to provide slots 38a. The sections 38 are secured together to form a unitary supporting bed by angle bars 39 at the ends of the bed.

The carriage 33 is provided with wheels 40 which run on tracks 41. The tracks are mounted on sleepers 42. The carriage is driven by a motor 43 which has driving connection through a speed reduction gear 44 to a drive shaft 45 to which is keyed a driving pinion 46. The pinion runs in mesh with a rack 47 attached to the carriage and extending approximately the full length thereof.

The cutting wires 36 are mounted in a frame 48 which is connected by pivots 49 to stationary supporting frames 50 positioned at the outer sides of the tracks 41 and about midway their length. The frames 50 are connected at their upper ends by a channel bar 50a. The frame 48 includes a lower tie bar 51 and an upper cross bar 52. The wires 36 are secured to and stretched between the bars 51 and 52. Turnbuckles 53 permit the tension of the wires to be adjusted. Each of the frames 50 is of triangular form comprising a horizontal channel bar 55, upwardly convergent channel bars 56 and a central vertical channel iron 57. The wire carrying frame 48 is held in an inclined position shown in full lines in FIG. 2 by clamps 58 pivoted at 59. The frame 48 is adapted to be swung to the broken line position 48a as hereinafter described. The wires are held in the inclined position to enter and leave the body 34 at an angle during the beginning and ending of the cutting operation respectively.

Tapered pins 62 (FIG. 2) are attached to the supporting bed units 38 and are adapted to enter mating holes formed in the mold bottom thereby aligning the slots 11 with the underlying slots 38a. The tapered pins 62 can be omitted, and proper alignment achieved solely through the use of the spacing bars 13.

Means providing a backing for the trailing end of the body 34 during the cutting operation, is illustrated in FIGS. 1 to 4. Such means includes a horizontal plate 63 overlying the supporting bed. Attached to the ends of the plate 63 are slide bars 64 slidably mounted on rails 65 (FIGS. 3 and 4) permitting adjustment lengthwise of the supporting bed. Clamps 66 hold the slide bars 64 in adjusted position. The plate 63 is formed with slots 63a in register with the slots 38a to accommodate the cutting wires 36 as the latter leave the trailing end of the body 34. Back-up fingers 67 in the form of vertical face plates individual to the members 38 are formed integral with the plate 63 and provide a backing for the trailing end of the body 34. The fingers 67 are braced by triangular webs 68 formed integral with the plate 63 and face plates 67. A facing 69 of sponge rubber or the like is attached to the plates 67.

The plate 63 with the fingers 67 is slidably mounted on the bars 64, permitting the fingers to be moved from a retracted position 67a (FIG. 2) forwardly to the full line clamping position. Means for effecting this clamping movement comprises levers 70 fulcrumed on pins 71 in brackets 72 on the bars 64. The forward ends of the levers are connected by pivots 73 to links 74 pivoted at 75 to the end webs 68. The levers 70 and links 74 form toggles by which the backing plates 67 are clamped against the body 34. By this construction a support is provided for the trailing end of the body 34 which prevents breaking or cracking of the material as the wires leave the body. It also may be noted that the backing plates or fingers serve to prevent backward movement of the tubular elements 12 during the cutting operation. A baffle 78 may be placed in the mold to permit castings shorter than the mold.

In operation the body 34 is formed by pouring slurry into the mold and allowing it to preharden. The sides and ends of the mold are then removed. The mold bottom supporting the body is then placed on the bed of the cutting machine with the slots in the mold bottom in register with those in the supporting bed. The spacing bars 13 are then removed. The motor 43 then drives the carriage forward so that the cutting wires 33 operate to cut the body 34 into individual slabs with each of the slabs being individually and completely supported by one of the tubular elements 12. The slabs may be removed from the carriage by means of bars similar to the spacing bars 13 and which are provided with plugs to fit into the ends of the mold bottom tubes 12. An alternate method of removing the slabs from the carriage consists in the use of bars which are extended through openings 76 formed in the side walls of the carriage.

During the operation of cutting the body 34 into slabs the carriage with the body thereon is moved from the full line position (FIG. 1) to the broken line position at the left of the cutters 36. The frame 48 carrying the cutting wires then may be swung to the left to the broken line position to reverse the lead in angle and locked by the clamp 58. The cutting bed may be loaded in its new position, permitting the next succeeding cutting operation to take place during the return travel of the carriage 33. Back-up fingers and their operating means are provided at both ends of the carriage.

Modifications may be resorted to within the spirit and scope of my invention.

I claim:

1. In apparatus for supporting and cutting semiplastic bodies cast in a mold, the combination of a carrier for receiving the unhardened plastic body to be cut, said carrier comprising a plurality of independent longitudinally extending tubes having a substantially rectangular cross-section, said tubes being parallel and closely laterally spaced from each other; a shiftable carriage comprising a supporting bed disposed beneath and supporting said tubes, said bed comprising individual elongated parallel elements narrowly spaced apart with slots therebetween, the lateral disposition of said bed element corresponding generally to that of said tubes; a horizontal track on which the carriage is mounted for longitudinal travel, means for driving said carriage along said track; a gang of cutting wires, a cutter frame on which the cutting wires are mounted in parallel spaced relationship, means for rigidly mounting said frame with said cutting wires extending below said supporting bed and extending upwardly through said slots and spaces to a position above the path of the molded body mounted on said tubes, said cutter frame and wires being inclined in a direction with the wires at an acute angle to the vertical ends of the body of molded material, the wires being operable to sever the molded body during the travel of the carriage into a plurality of laterally separated individual slabs, each of said slabs individually supported by one of said tubes.

2. The apparatus defined in claim 1, plus a horizontal plate mounted on said supporting bed and a plurality of upstanding fingers rising from said plate and adapted to engage the trailing end of the unhardened semiplastic body during relative movement of said carriage and said cutters, said fingers being spaced intermediate with said slots and spaces.

3. In an apparatus for supporting and cutting semiplastic bodies cast in a mold, the combination of a carrier for receiving the unhardened semiplastic body to be cut, said carrier comprising a plurality of independent longitudinally extending tubes having a substantially rectangular cross-section, said tubes being parallel and closely laterally spaced from each other; a shiftable carriage comprising a supporting bed disposed beneath and supporting said tubes, said bed comprising individual elongated parallel elements narrowly spaced apart with slots therebetween, the lateral disposition of said bed elements corresponding generally to that of said tubes; a horizontal track on which the carriage is mounted for longitudinal travel, a motor, gearing connecting the motor to the carriage for driving the latter back and forth on said track; a gang of cutting wires, a cutter frame on which the cutting wires are mounted in parallel spaced relation, said frame mounted to swing about a horizontal pivot positioned below the said supporting bed and perpendicular to the direction of travel of the carriage, said wires extending upwardly through said slots and spaces to a position above the path of the molded body mounted on said tubes, the cutter frame and wires being inclined in a direction with the wires at an acute angle to the vertical ends of the body of molded material, the wires being operable to sever the molded body, during the travel of the carriage, into a plurality of laterally separated individual slabs, each of said slabs individually supported by one of said tubes.

4. The apparatus as defined in claim 3, wherein said carriage is adapted to be movable into positions at opposite sides of the cutters, thereby permitting the body of molded material to be severed by the cutters during the travel of the carriage in either direction, and wherein said cutter frame is mounted to swing into positions at opposite sides of a vertical plane, and means for locking the cutter frame in either of said positions.

References Cited in the file of this patent
UNITED STATES PATENTS

| | | |
|---|---|---|
| 1,582,103 | Vitullo | Apr. 27, 1926 |
| 1,602,035 | McLaughlin | Oct. 5, 1926 |
| 1,692,913 | Whiting | Nov. 27, 1928 |
| 2,393,185 | Pollard | Jan. 15, 1946 |
| 2,694,846 | Olsson | Nov. 23, 1954 |
| 2,978,777 | Carlsson et al. | Apr. 11, 1961 |

FOREIGN PATENTS

| | | |
|---|---|---|
| 1,045,254 | France | June 24, 1953 |
| 1,078,030 | France | May 5, 1954 |